(12) United States Patent
Enomoto (10) Patent No.: US 6,603,927 B2
(45) Date of Patent: Aug. 5, 2003

(54) FOCUSED IMAGE TREMBLE CORRECTING DEVICE

(75) Inventor: Shigeo Enomoto, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 10/231,123

(22) Filed: Aug. 30, 2002

(65) Prior Publication Data

US 2003/0044175 A1 Mar. 6, 2003

(30) Foreign Application Priority Data

Aug. 31, 2001 (JP) .................................. 2001-263424

(51) Int. Cl.[7] ................................................ G03B 5/00
(52) U.S. Cl. ...................................................... 396/55
(58) Field of Search ..................... 396/55; 359/54–57; 348/208.11, 208.7

(56) References Cited

U.S. PATENT DOCUMENTS 5,266,988 A   11/1993 Washisu ...................... 396/55
5,655,157 A   8/1997 Enomoto ...................... 396/55
6,456,790 B2   9/2002 Sasaki et al. ................. 396/55

FOREIGN PATENT DOCUMENTS

JP   2641172   5/1997 ............ G03B/5/00

Primary Examiner—W. B. Perkey
(74) Attorney, Agent, or Firm—Greenblum & Bernstein, P.L.C.

(57) ABSTRACT

A correction lens is supported in a generally cylindrical supporting member such that its optical axis is coaxial with the central axis of the supporting member. A flange is formed on an outer surface of the supporting member. A first opening is formed in a first rotating board, and a second opening is formed in a second rotating board. First and second cylindrical portions at both end sides of the supporting member respectively penetrate through the first and second openings. The flange is positioned between the first and second rotating boards. When the first rotating board is rotated, the first cylindrical portion is supported by the upper and lower sides of the first opening and is led by the second opening. When the second rotating board is rotated, the second cylindrical portion is supported by left and right sides of the second opening and is led by the first opening.

8 Claims, 6 Drawing Sheets

FOCUSED IMAGE TREMBLE CORRECTING DEVICE

BACKGROUND OF THE INVENTION

1. Field of the Invention

This invention relates to a device which corrects a focused image tremble of an optical device due to hand tremble and so on.

2. Description of the Related Art

Conventionally, there are some optical devices, for example a camera, which are provided with a focused image tremble correcting device for correcting a focused image tremble due to a hand tremble and so on. Japanese patent gazette No. 2641172 suggests a correcting device which corrects a focused image tremble by moving a correcting optical system in two directions which cross at right angles and are perpendicular to the optical axis of the correcting optical device. The two directions are the pitch direction and the yaw direction.

In the correcting device, a fixed frame which holds the correcting optical system is provided with driving mechanisms and leading mechanisms with respect to each of the pitch and yaw directions. Each of the driving mechanisms includes an electromagnetic coil, and each of the leading mechanisms includes a combination of a shaft and a coil spring. Two driving mechanisms and two leading mechanisms are provided for moving the fixed frame in the pitch direction, and two other driving mechanisms and two other leading mechanisms are provided for moving the fixed frame in the yaw direction. Namely, the fixed frame is moved in the pitch direction by a pair of the driving mechanisms and a pair of the leading mechanisms, and is moved in the yaw direction by another pair of the driving mechanisms and another pair of the leading mechanisms.

Accordingly, in order to precisely drive the fixed frame in a direction parallel to the pitch direction, members included in the leading mechanisms need to be precisely assembled, and further high precision of the positional relationship between the pair of leading mechanisms is required. Also, in order to precisely drive the fixed frame in a direction parallel to the yaw direction, the same levels of precision are required.

Namely, in each of the leading mechanisms, it is necessary to improve the precision of engagement of the shaft and the coil spring, and further the shafts of each of the pair of the leading mechanisms should be placed so as to be parallel to the leading direction of the leading mechanisms.

Accordingly, it is not easy to assemble and place the leading mechanisms, so it is difficult to precisely drive the fixed frame in the pitch and yaw directions. Further, if the assembly and placement of the leading mechanisms are not accurately carried out, when the fixed frame is driven, a large load is added to each member of the leading mechanisms, so the durability of each member becomes low.

SUMMARY OF THE INVENTION

Therefore, an object of the present invention is to provide a focused image tremble correcting device, the structure of which is simple, and which is able to perform correction with high precision.

In accordance with an aspect of the present invention, there is provided a focused image tremble correcting device comprising: a tremble detector that detects a focused image tremble of an optical device; a correcting optical system for correcting the focused image tremble, the correcting optical system being included in an imaging optical system of the optical device; a first driving unit; a second driving unit; and a controller that controls the first and second driving units to move the correcting optical system such that the image tremble can be cancelled.

The first driving unit includes: a first rotating board which is held being rotatable around a first axis parallel to the optical axis of the correcting optical system; and a first driving mechanism that drives the first rotating board. The first rotating board has a first opening. The second driving unit includes: a second rotating board which is held being rotatable around a second axis which is parallel to the optical axis; and a second driving mechanism that drives the second rotating board. The second rotating board has a second opening. The correcting optical axis is supported by a first pair of inner sides of the first opening and a second pair of inner sides of the second opening. The first pair of inner sides is parallel to a first straight line that is perpendicular to the optical axis and the first axis. The second pair of inner sides is parallel to a second straight line perpendicular to the optical axis and the second axis.

Preferably, when the correcting optical system is driven in accordance with a rotation of the first rotating board, the correcting optical system is moved along the first pair of inner sides, being led by the second pair of inner sides, and when the correcting optical system is driven in accordance with a rotation of the second rotating board, the correcting optical system is moved along the second pair of inner sides, being led by the first pair of inner sides.

Preferably, in a two-dimensional coordinate system on a plane which is perpendicular to the optical axis of the correcting optical system that is positioned at a standard position in which the optical axis of the correction optical system is coaxial with an optical axis of other optical systems included in the imaging optical system, an origin of the two-dimensional coordinate being an intersection point of the optical axis of the correction optical system and the perpendicular plane, an X-axis of the two-dimensional coordinate being a straight line connecting the origin and an intersection point of the first axis and the perpendicular plane, a Y-axis of the two-dimensional coordinate being a straight line connecting the origin and an intersection point of the second axis and the perpendicular plane, a rotational angle θ1 of the first rotating board which is rotated to cancel the focused image tremble and a rotational angle θ2 of the second rotating board which is rotated to cancel the focused image tremble are calculated based on the formulas to follow.

$$\theta 1 = \tan^{-1}(p2/(d1+p1)) \quad (1)$$

$$\theta 2 = \tan^{-1}(p1/(d2+p2)) \quad (2)$$

(herein, d1: an absolute value of an X coordinate of the first axis in the two-dimensional coordinate d2: an absolute value of a Y coordinate of the second axis in the two-dimensional coordinate p1: an absolute value of an X coordinate of the optical axis of the correcting optical system being at an aimed position at which the correction optical system has to be moved to cancel the image tremble, p2: an absolute value of a Y coordinate of the optical axis of the correcting optical system being at the aimed position)

BRIEF DESCRIPTION OF THE DRAWINGS

The objects of the present invention will be better understood from the following description, with reference to the accompanying drawings, in which.

DESCRIPTION OF THE PREFERRED EMBODIMENTS

The present invention will now be described with reference to embodiments shown in the drawings.

Figure 1:
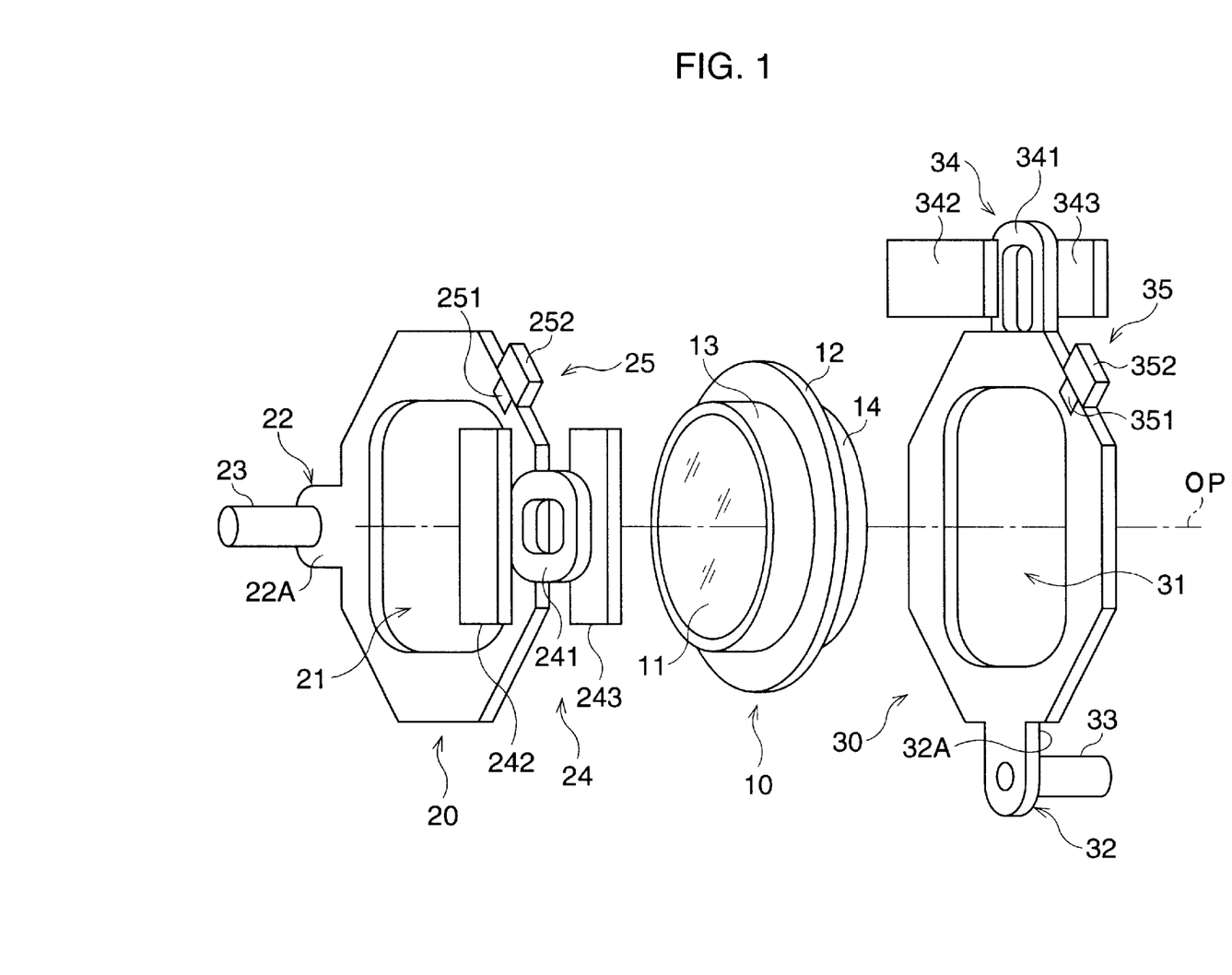
FIG. 1 is an exploded perspective view which shows a main portion of a focused image tremble correcting device to which a first embodiment, according to the present invention, is applied.

FIG. 1 is an exploded perspective view which shows a main portion of a focused image tremble correcting device to which a first embodiment, according to the present invention, is applied. Note that, the focused image tremble correcting device is mounted in a photographing lens barrel of an optical device, for example a camera.

A supporting member 10 has a generally cylindrical shape. A correcting lens 11 is supported in the supporting member 10. The correcting lens 11 is positioned in the supporting member 10 such that its optical axis OP is coaxial with the central axis of the supporting member 10. A flange 12, which has a predetermined height, is formed on an outer surface of the supporting member 10 so as to be along a circumferential direction of the outer surface.

A first rotating board 20 has a generally octagonal shape. A first opening 21 is formed at the center of the first rotating board 20. Similarly, a second rotating board 36 has a generally octagonal shape, and a second opening 31 is formed at the center of the second rotating board 30. The supporting member 10 is placed between the first and second rotating boards 20 and 30 such that: a cylindrical portion 13 at one end side of the supporting member 10 penetrates through the first opening 21; a cylindrical portion 14 at another end side of the supporting member 10 penetrates through the second opening 31; and the flange 12 is positioned between the first and second rotating boards 20 and 30.

A projecting portion 22 is unitarily formed on one of the side portions of the first rotating board 20. The projecting portion 22 extends along a radial direction of the first rotating board 20. A first rotating shaft 23 is provided on a plane portion 22A of the projecting portion 22. The plane portion 22A is opposite to a plane portion, of the projecting portion 22, which faces the flange 12. The first rotating shaft 23 is situated such that its central axis is parallel to the optical axis OP.

A first driving mechanism 24 is provided at an opposite side of the first rotating board 20 to the projecting portion 22, so that the first opening 21 is therebetween. The first driving mechanism 24 is provided with a driving coil 241, a magnet 242, and a yoke plate 243. The driving coil 241 is a flat coil in which lead wires are wound around an axis parallel to the optical axis OP. The magnet 242 and the yoke plate 243 are fixed on an inner wall of the lens barrel of the optical device, for example a camera, on which the focused image tremble correcting device is mounted, and the driving coil 241 is fixed on the first rotating board 20, such that the driving coil 241 is positioned between the magnet 242 and the yoke plate 243.

A first position detecting mechanism 25 is provided close to the first driving mechanism 24. The first position detecting mechanism 25 is provided with a position detecting magnet 251 and an MR (Magnetic Resistance) sensor 252. The magnet 251 is fixed on the first rotating board 20 and the MR sensor 252 is fixed on the inner wall of the lens barrel. The magnet 251 and the MR sensor 252 are positioned so as to face each other. As described later, when the first rotating board 20 is rotated around the first rotating shaft 23, positional change of the first rotating board 20 is detected based on a change in the output signal of the MR sensor 252.

A projecting portion 32 is unitarily formed on one of the side portions of the second rotating board 30. The projecting portion 32 extends along a radial direction of the second rotating board 30. A second rotating shaft 33 is provided on a plane portion 32A of the projecting portion 32. The plane portion 32A is opposite to a plane portion, of the projecting portion 32, which faces the flange 12. The second rotating shaft 33 is situated such that its central axis is parallel to the optical axis OP.

A second driving mechanism 34 is provided at an opposite side of the second rotating board 30 to the projecting portion 32, so that the second opening 31 is therebetween. The second driving mechanism 34 is provided with a driving coil 341 which is a flat coil similar to the driving coil 241, a magnet 342, and a yoke plate 343. The magnet 342 and the yoke plate 343 are fixed on the inner wall of the lens barrel of the optical device on which the focused image tremble correcting device is mounted, and the driving coil 341 is fixed on the second rotating board 30, such that the driving coil 341 is positioned between the magnet 342 and the yoke plate 343.

A second position detecting mechanism 35 is provided close to the second driving mechanism 34. The second position detecting mechanism 35 is provided with a position detecting magnet 351 and an MR sensor 352. The magnet 351 is fixed on the second rotating board 30 and the MR sensor 352 is fixed on the inner wall of the lens barrel. The magnet 351 and the MR sensor 352 are positioned so as to face each other. As described later, when the second rotating board 30 is rotated around the second rotating shaft 33, positional change of the second rotating board 30 is detected based on a change in the output signal of the MR sensor 352.

Figure 2:
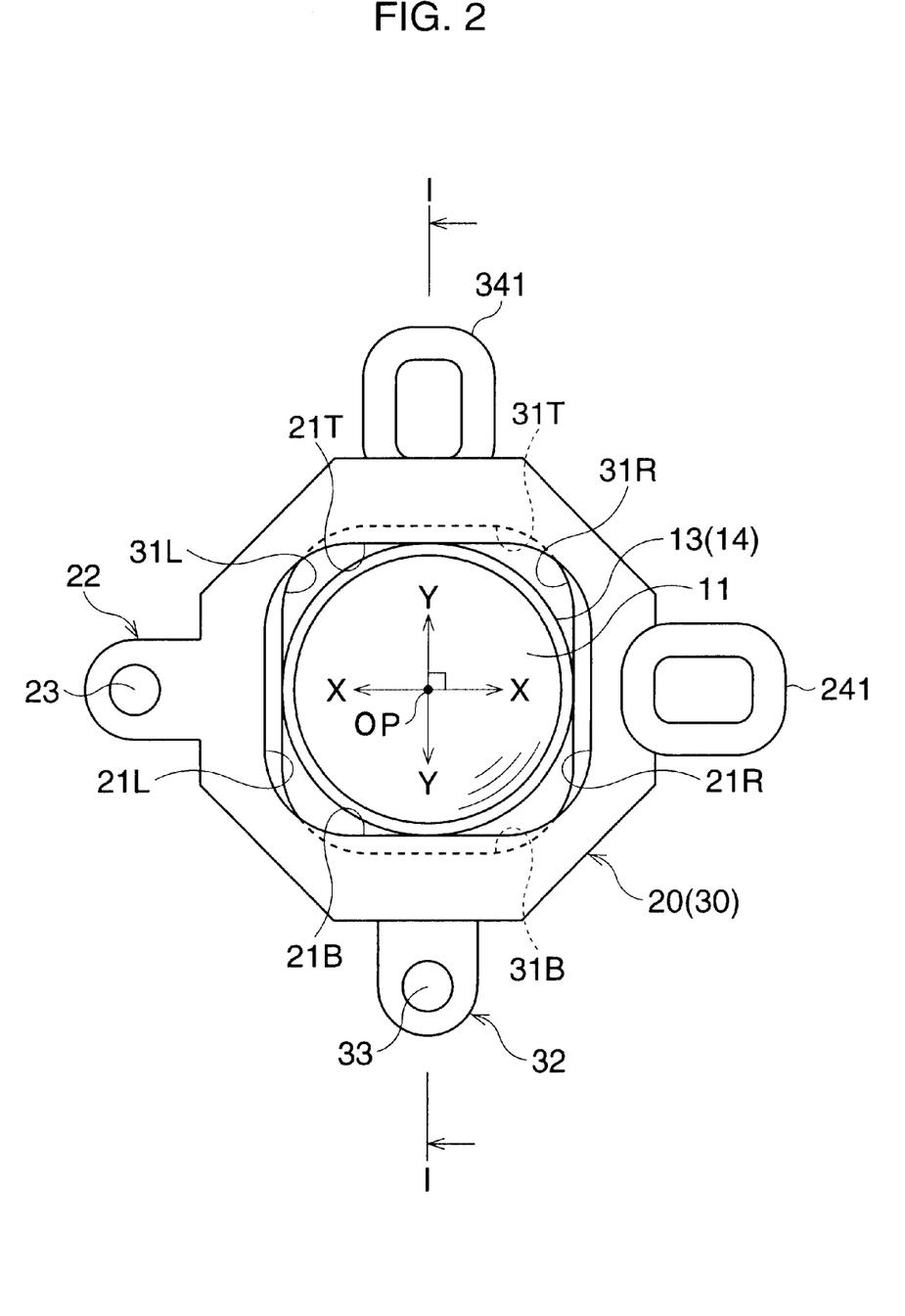
FIG. 2 is a front view which shows the focused image tremble correcting device which is assembled.

FIG. 2 is a front view which shows the focused image tremble correcting device which is assembled, viewing from the side at which the first rotating board 20 is situated. Note that, in FIG. 2, some members of the flange 12, and the first and second driving mechanisms 24 and 34 are omitted in order to clearly show a positional relationship between the other members.

FIG. 2 shows the correction lens 11 positioned at the standard position. When the correction lens 11 is positioned at the standard position, the optical axis OP of the correction lens 11 which is part of the photographing optical system (imaging optical system) is coaxial with an optical axis of the other optical systems which are included in the photographing optical system.

The first and second rotating boards 20 and 30 are situated such that the position of the first rotating shaft 23 and the second rotating shaft 33 forms a right angle on a plane perpendicular to the optical axis OP. In other words, a right angle is formed on a plane perpendicular to the optical axis OP of the correction lens 11 when a line from the central axis of the first rotating shaft 23 and a line from the central axis of the second rotating shaft 33 meet at the optical axis OP.

In the first opening 21, a side 21T which is an upper side in FIG. 2 and a side 21B which is a lower side in FIG. 2 are parallel, and a side 21R which is a right side in FIG. 2 and a side 21L which is a left side in FIG. 2 are parallel. Similarly, in the second opening 31, a side 31T which is an upper side in FIG. 2 and a side 31B which is a lower side in FIG. 2 are parallel, and a side 31R which is a right side in FIG. 2 and a side 31L which is a left side in FIG. 2 are parallel.

Further, when the correction lens 11 is situated at the standard position as shown in FIG. 2, the side 21L (21R) of the first opening 21 and the side 31L (31R) of the second opening 31 are parallel, and the side 21T (21B) of the first opening 21 and the side 31T (31B) of the second opening 31 are parallel, and the side 21L (21R) and the side 31T (31B) cross at right angles.

In the first opening 21, the sides 21T and 21B extend along straight lines which are parallel to the line connecting the optical axis OP and the center of the first rotating shaft 23, on the plane perpendicular to the optical axis OP of the correction lens 11, and cross the rotating direction of the first rotating board 20 at generally right angles.

Further, in the second opening 31, the sides 31L and 31R extend along straight lines which are parallel to the line connecting the optical axis OP and the center of the second rotating shaft 33, on the plane perpendicular to the optical axis OP, and cross the rotating direction of the second rotating board 30 at generally right angles.

The outer surface of the cylindrical portion 13 of the supporting member 10 is in slidable contact with the sides 21T and 21B in the first opening 21, and the outer surface of the cylindrical portion 14 of the supporting member 10 is in slidable contact with the sides 31L and 31R in the second opening 31. In other words, the outer diameter of the cylindrical portion 13 approximately equals the length between the side 21T and 21B of the first opening 21, and the outer diameter of the cylindrical portion 14 approximately equals the length between the sides 31L and 31R of the second opening 31.

Further, a gap exists between the outer surface of the cylindrical portion 13 and the side 21L which is at the left side in FIG. 2, and a gap exists between the outer surface of the cylindrical portion 13 and the side 21R which is at the right side in FIG. 2. Also, a gap exists between the outer surface of the cylindrical portion 14 and the side 31T which is at the upper side in FIG. 2, and a gap exists between the outer surface of the cylindrical portion 14 and the side 31B which is at the lower side in FIG. 2.

Namely, the first opening 21 has a generally rectangular shape in which the sides 21T and 21B are long sides and the sides 21R and 21L are short sides. The second opening 31 has a generally rectangular shape in which the sides 31R and 31L are long sides and the sides 31T and 31B are short sides.

Accordingly, in a tangential direction of an arc, the center of which is the first rotating shaft 23, the supporting member 10 is movable between the sides 31T and 31B of the second opening 31 together with the first rotating board 20, being led by the sides 31L and 31R of the second opening 31, while the supporting member 10 is moved in the direction in which the sides 21T and 21B of the first opening 21 extend, being supported by the sides 21T and 21B.

Further, in a tangential direction of an arc, the center of which is the second rotating shaft 33, the supporting member 10 is movable between the sides 21L and 21R of the first opening 21 together with the second rotating board 30, being led by the sides 21T and 21B of the first opening 21, while the supporting member 10 is moved in the direction in which the sides 31L and 31R of the second opening 31 extend, being supported by the sides 31L and 31R.

When the correction lens 11 is at the standard position as shown in FIG. 2, if only the first rotating board 20 is rotated, the supporting member 10 is substantially linearly led in the direction Y—Y (Y axis direction). Similarly, when the correction lens 11 is at the standard position, if only the second rotating board 30 is rotated, the supporting member 10 is linearly led in the direction X—X (X axis direction) which is perpendicular to the direction Y—Y.

Figure 3:
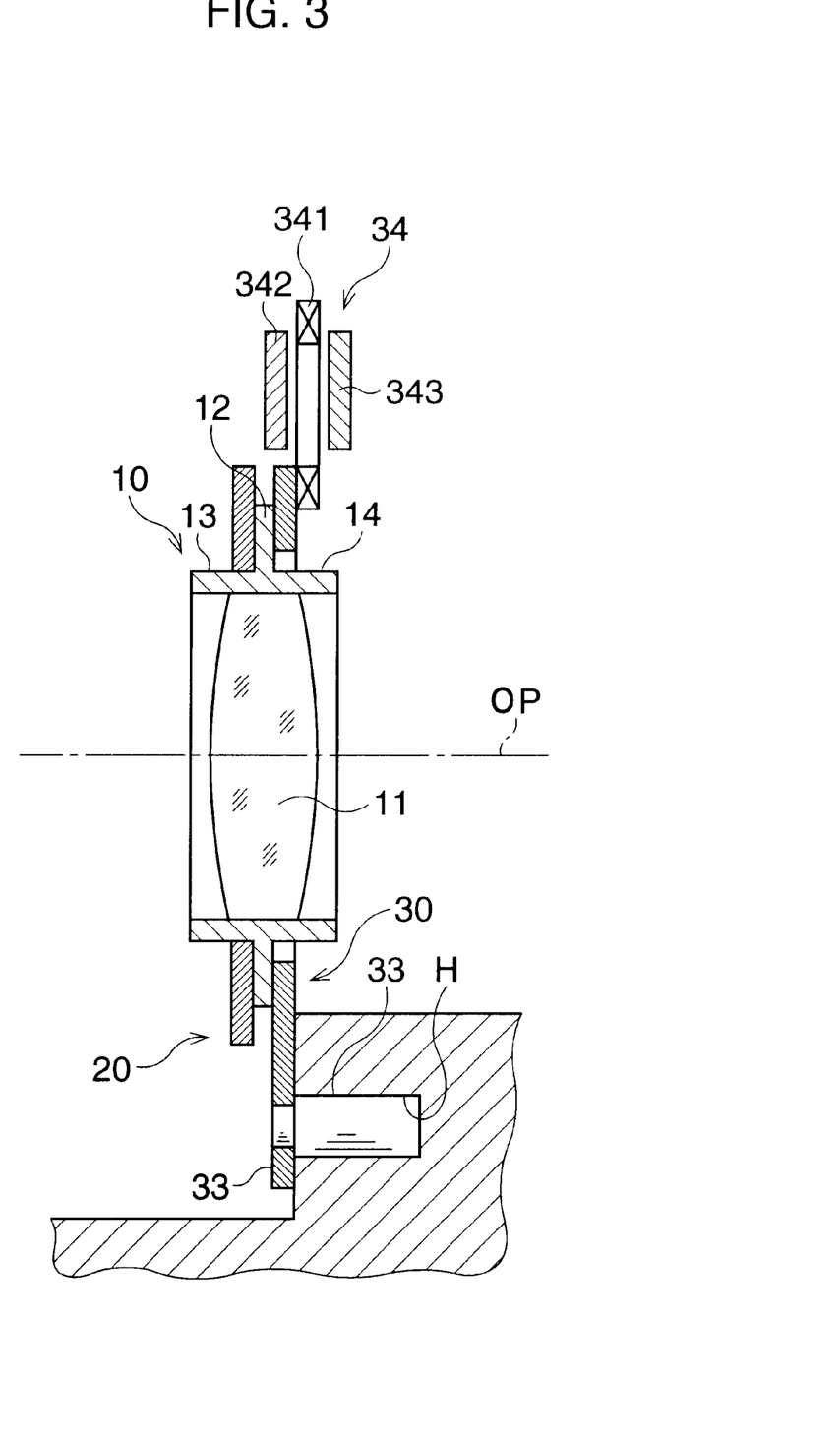
FIG. 3 is a side sectional view of the focused image tremble correcting device.

FIG. 3 is a sectional view of the focused image tremble correcting device taken in the direction of the arrows substantially along the line I—I of FIG. 2. The second rotating shaft 33 is engaged with a bearing hole H which is formed in the inner wall of the lens barrel. The shaft 33 is rotatable around its central axis. Also, the first rotating shaft 23 is engaged with a bearing hole which is formed in the inner wall of the lens barrel, being rotatable around its central axis. Note that, this engagement is not depicted in FIG. 3.

Namely, in the lens barrel, the first and second rotating boards 20 and 30 are respectively rotatably supported by the first and second rotating shafts 23 and 33. The rotation of the first rotating board 20 is controlled by controlling magnitude and direction of electric current which is supplied to the driving coil 241 (see FIGS. 1 and 2) of the first driving mechanism 24, and the rotation of the second rotating board 30 is controlled by controlling magnitude and direction of electric current which is supplied to the driving coil 341 (see FIGS. 1 and 2) of the second driving mechanism 34.

Further, as shown in FIG. 3, the flange 12 of the supporting member 10 is held by the first and second rotating boards 20 and 30, being slidably movable between the first and second rotating boards 20 and 30. Accordingly, when the supporting member 10 is moved in accordance with the rotation of the first and second rotating boards 20 and 30, the optical axis OP is prevented from inclining and the correction lens 11 is prevented from moving along the optical axis OP.

Figure 4:
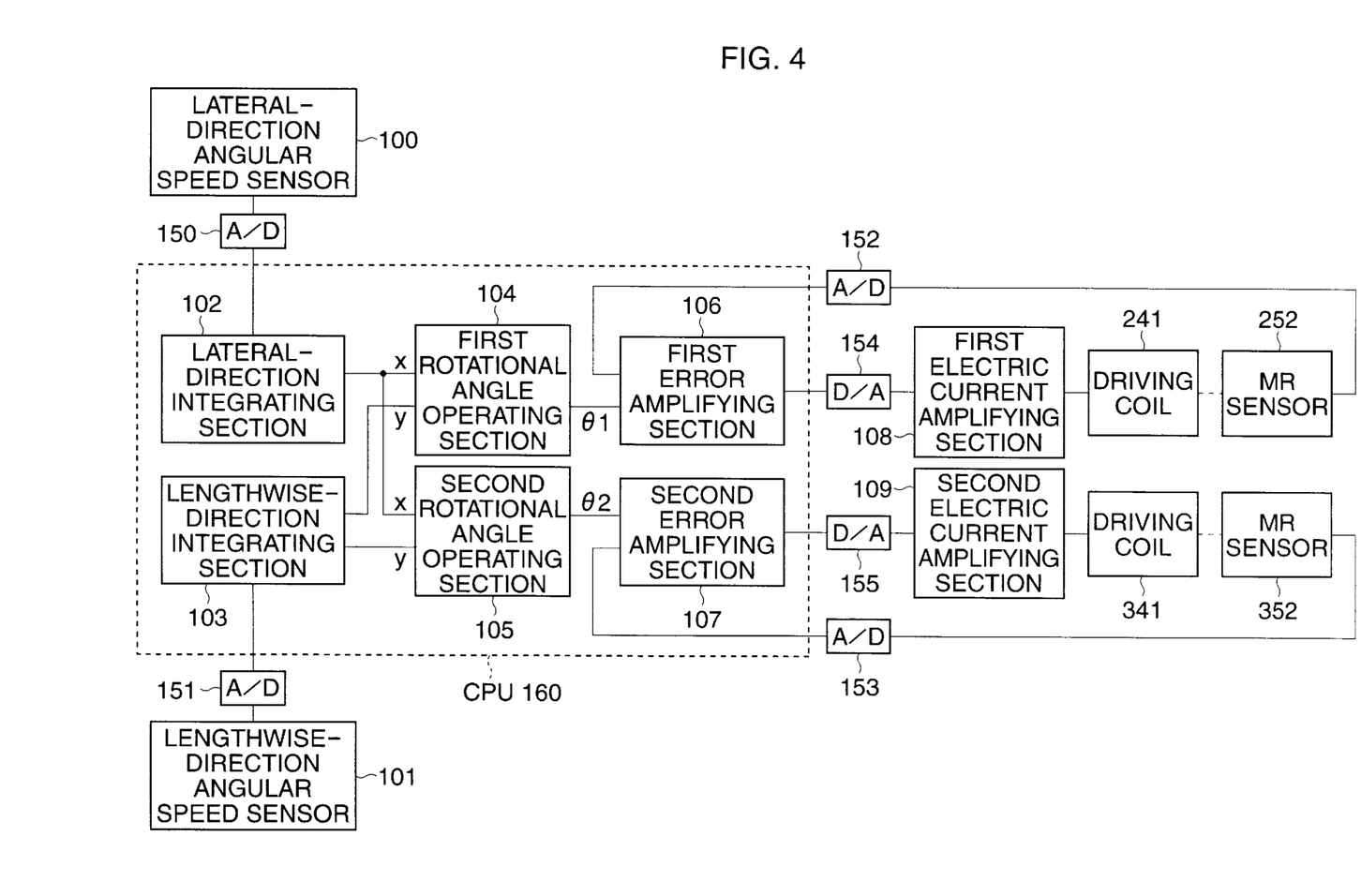
FIG. 4 is a block diagram of the driving control of a correction lens in the first embodiment.

FIG. 4 is a block diagram of the driving control of the correction lens 11 in the first embodiment. A lateral-direction angular speed sensor 100 detects the direction and the angular speed of the tremble of the camera for the lateral direction. A lengthwise-direction angular speed sensor 101 detects the direction and the angular speed of the tremble of the camera for the lengthwise direction. For example, a piezoelectric gyro sensor is utilized for the angular speed sensors 100 and 101.

After output signals from the angular speed sensor 100 are amplified and converted to digital signals by an A/D converter 150, the digital signals are input to a lateral-direction integrating section 102 of a CPU 160 which is indicated by a broken line. In the integrating section 102, the digital signals are integrated, and angular displacement data "x" of the photographing optical system in the lateral direction are calculated.

Similarly, after output signals from the angular speed sensor 101 are amplified and converted to digital signals by an A/D converter 151, the digital signals are integrated in a lengthwise-direction integrating section 103 of the CPU 160, and angular displacement data "y" of the photographing optical system in the lengthwise direction are calculated.

A first rotational angle operating section 104 is a section for calculating the rotational angle θ1 of the first rotating board 20, and a second rotational angle operating section 105 is a section for calculating the rotational angle θ2 of the second rotating board 30. The lateral-direction angular displacement data "x" are input to the first and second sections 104 and 105. Similarly, the lengthwise-direction angular displacement data "y" are input to the first and second sections 104 and 105. Note that, the relationship between the data "x" and "y" and the rotational angles θ1 and θ2 will be explained later.

The rotational angle θ1 of the first rotating board 20 is input to a first error amplifying section 106. Further, output signals of the MR sensor 252 are converted to digital signals by an A/D converter 152, and the digital signals are input to the section 106. The rotational angle θ1, calculated in the first rotational angle operating section 104, is the angle by which the first rotating board 20 has to be rotated in order to cancel the focused image tremble. The signals output by the MR sensor 252 indicate the current rotational position of the first rotating board 20.

In the first error amplifying section 106, the rotating amount of the first rotating board 20 is calculated based on the rotational angle θ1 and the digitalized output signal of the MR sensor 252, and is output as driving signal of the driving coil 241. The driving signal output from the section 106 is converted to an analog signal by a D/A converter 154, and the analog signal is amplified in a first electric current amplifying section 108. Based on the amplified signal, electric current of a given amount is sent in a given direction through the driving coil 241. When the first rotating board 20 is rotated by supplying the electric current, the change of position of the first rotating board 20 is detected by the MR sensor 252, then the result of the detection is input to the amplifying section 106 after being converted to a digital signal by the A/D converter 152, and the above-mentioned operation is repeated.

The rotational angle θ2 of the second rotating board 30 is input to a second error amplifying section 107. Further, output signals of the MR sensor 352 are converted to digital signals by an A/D converter 153, and the digital signals are input to the section 107. The rotational angle $θ_2$ is the angle by which the second rotating board 20 has to be rotated in order to cancel the focused image tremble. The signals output by the MR sensor 352 indicate the current positional information of the second rotating board 30.

In the second error amplifying section 107, the rotating amount of the second rotating board 30 is calculated based on the rotational angle θ2 and the digitalized output signals of the MR sensor 352, and is output as a driving signal of the driving coil 341. The driving signal output from the section 107 is converted to analog signal by a D/A converter 155, and the analog signal is amplified in a second electric current amplifying section 109. Based on the amplified signal, electric current of a given amount is sent in a given direction through the driving coil 341. When the second rotating board 30 is rotated by supplying the electric current, the change of position of the second rotating board 30 is detected by the MR sensor 352, then the result of the detection is input to the amplifying section 107 after being converted to digital signal by the A/D converter 153, and the above-mentioned operation is repeated.

The first and second rotating boards 20 and 30 are rotated to an aimed position by the above-mentioned feedback control, so that the correction lens 11 in the supporting member 10 is positioned whereby the focused image tremble can be cancelled.

Figure 5:
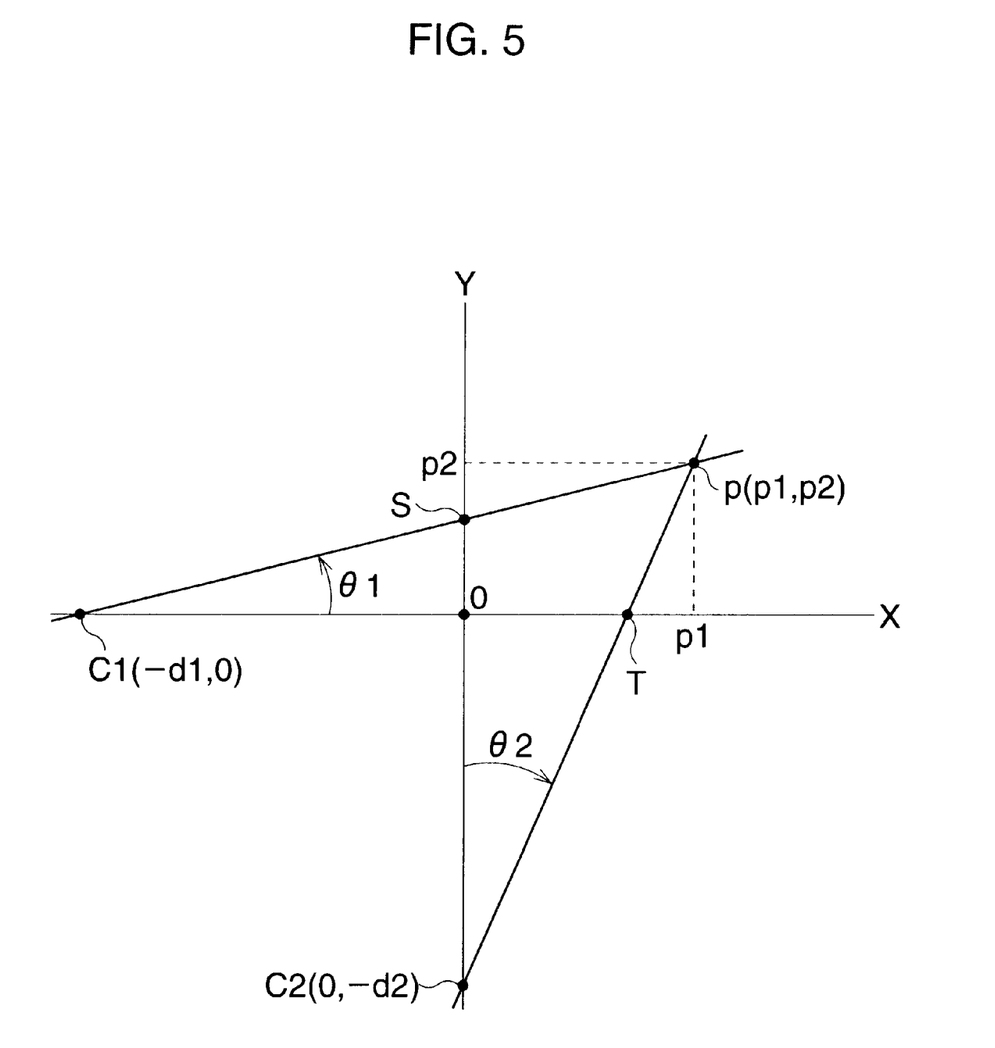
FIG. 5 is a two-dimensional coordinate on a focal plane of a photographing optical system of the first embodiment.

FIG. 5 shows a two-dimensional coordinate on a focal plane of the photographing optical system of the first embodiment. The origin O is an intersection point of the optical axis OP of the correction lens 11 positioned at the standard position and the focal plane. The optical axis OP extends in a direction perpendicular to FIG. 5. When the correction lens 11 is positioned at the standard position, the optical axis OP is coaxial with the optical axis of the other optical systems of the photographing optical system.

A point C1 is an intersection point of the central axis of the first rotating shaft 23 and the focal plane, and a point C2 is an intersection point of the central axis of the second rotating shaft 33 and the focal plane. A point P is a position of the optical axis OP which is calculated in the lateral-direction and lengthwise-direction integrating sections 102 and 103. Namely, the point P is an aimed position at which the correction lens 11 has to be moved for correcting.

The relationship defined by formulas (3) and (4) exists between the points P, C1, and C2. Further, formulas (5) and (6) are obtained based on the formulas (3) and (4). The rotating angles θ1 and θ2 of the first and second rotating boards 20 and 30 are calculated by the formulas (5) and (6).

$$\tan θ1 = p2/(d1+p1) \quad (3)$$

$$\tan θ2 = p1/(d2+p2) \quad (4)$$

$$θ1 = \tan^{-1}(p2/(d1+p1)) \quad (5)$$

$$θ2 = \tan^{-1}(p1/(d2+p2)) \quad (6)$$

(herein, d1: distance between the central axis of the first rotating shaft 23 and the optical axis OP of the correction lens 11 at the standard position, d2: distance between the central axis of the second rotating shaft 33 and the optical axis OP of the correction lens 11 at the standard position, p1: X coordinate of the optical axis OP of the correction lens 11 which is driven in order to correct the focused image tremble, p2: Y coordinate of the optical axis OP of the correction lens 11 which is driven in order to correct the focused image tremble, θ1: rotational angle of the first rotating board 20 which is driven in order to correct the focused image tremble, θ2: rotational angle of the second rotating board 30 which is driven in order to correct the focused image tremble)

Note that, d1 is an absolute value of the X-coordinate of the central axis of the first rotating shaft 23, and d2 is an absolute value of the Y-coordinate of the central axis of the second rotating shaft 33. further, Now, the change of the position of the correction lens 11 in the tremble correction is explained with reference to FIG. 5. First, when the first rotating board 20 is rotated in the counterclockwise direction by the angle θ1 in a state where the correction lens 11 is positioned at the standard position, the supporting member 10 is moved being led by the second opening 31. Consequently, the optical axis OP is linearly moved from the origin O to a point S along the Y axis which corresponds to the direction Y—Y in FIG. 2.

After this rotation of the first rotating board 20, when the second rotating board 30 is rotated in the clockwise direction by the angle θ2, the supporting member 10 is moved being led by the first opening 21 of the first rotating board 20 which has been rotated by the angle θ1. Consequently, the optical axis OP is moved from the point S to the point P along a straight line which includes the points C1 and S.

If the second rotating board 30 is rotated before the first rotating board 20 is rotated, the optical axis OP is moved as described below. When the second rotating board 30 is rotated in the clockwise direction by the angle θ2 in the state where the correction lens 11 is positioned at the standard position, the optical axis OP is moved from the origin O to a point T along the X axis which includes the point C1 and the origin O. The X axis corresponds to the direction X—X in FIG. 2. After this rotation of the second rotating board 30, the first rotating board 20 is rotated in the counterclockwise direction by the angle θ1. Consequently, the optical axis OP is moved from the point T to the point P along the straight line which includes the points C2 and T.

As described above, the direction, in which the supporting member 10 is led in accordance with the rotation of the first rotating board 20, is defined by the sides 31L and 31R of the second opening 31 of the second rotating board 30, and depends on the present position of the second rotating board 30. Also, the direction, in which the supporting member 10 is led in accordance with the rotation of the second rotating board 30, is defined by the sides 21T and 21B of the first opening 21 of the first rotating board 20, and depends on the present position of the first rotating board 20. In other words, the direction in which the supporting member 10 is led, namely the direction in which the supporting member 10 moves, is changeable in accordance with the positional relationship between the first and second rotating boards 20 and 30.

According to the first embodiment, the first and second rotating boards 20 and 30 are respectively supported by the first and second rotating shafts 23 and 33, and are respectively driven by the driving mechanisms 24 and 34 which are single units. Namely, the structures of the supporting mechanisms and the driving mechanisms of the supporting member 10 are simple. Accordingly, manufacturing of the correcting device is facilitated.

Further, since the driving of each of the rotating boards is carried out by a single unit in which an electromagnetic coil is utilized, the whole weight of the focused image tremble correcting device can be lightened and the consumption of driving electric current can be reduced.

Further, when one of the first and second rotating boards 20 and 30 is rotated, the supporting member 10 is moved in a substantially linear direction defined by the opening of the other of the first and second rotating boards 20 and 30, the position of which has been determined at that time. Accordingly, the moving of the correction lens 11 in accordance with the rotating of the first and second rotating boards 20 and 30 can be accurately carried out, so that the precision of the focused image tremble correction can be improved.

Further, the first and second rotating boards 20 and 30 have the function of supporting the supporting member 10 such that the supporting member 10 is rotatable on the plane perpendicular to the optical axis OP, and the function of leading the supporting member 10 which is driven by the driving mechanisms. Accordingly, it is unnecessary to provide different mechanisms for driving and leading the supporting member 10, so that the number of members in the focused image tremble correcting device can be decreased and the manufacturing cost can be lowered.

Figure 6:
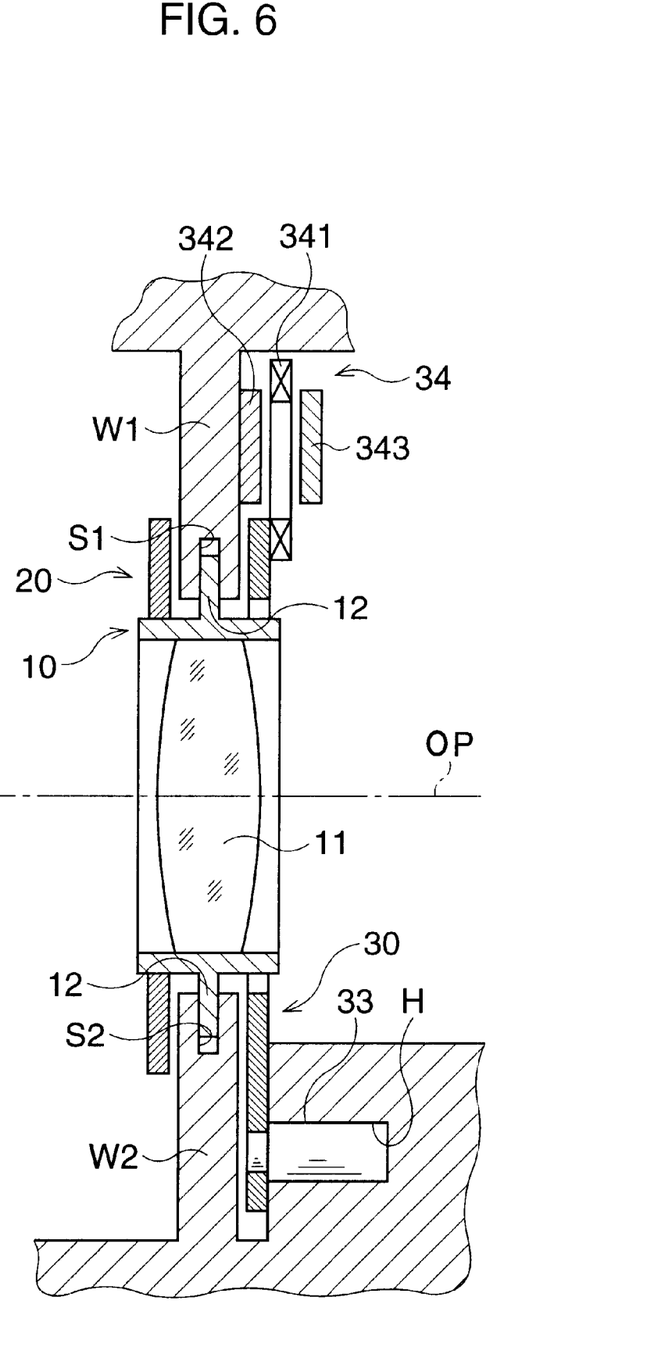
FIG. 6 is a sectional view of a focused image tremble correcting device to which a second embodiment, according to the present invention, is applied.

FIG. 6 is a sectional view of a focused image tremble correcting device to which a second embodiment, according to the present invention, is applied. In FIG. 6, components utilized in the first embodiment, which are identical to those in the second embodiment, share the same reference numerals.

Wall portions W1 and W2 are formed on the inner wall of the lens barrel. The wall portions W1 and W2 project toward the center of the lens barrel. The first and second rotating boards 20 and 30 are mounted so as to face each other with the wall portions W1 and W2 between. A slit S1 is formed in the wall portion W1, and a slit S2 is formed in the wall portion W2. One portion of the periphery of the flange 12 of the supporting member 10 is inserted in the slit S1, another portion of the periphery of the flange 12 is inserted in the slit S2. These portions are in slidable contact with the inner surface of the slits S1 and S2.

Namely, the supporting member 10 is supported so as to be movable along the plane perpendicular to the optical axis OP, being prevented from moving along the optical axis OP. Note that, predetermined gaps exist between the flange 12 and the slits S1 and S2 so as not to disturb the driving of the supporting member 10 by the rotations of the first and second rotating boards 20 and 30. Other structures are similar to those of the focused image tremble correcting device shown in FIGS. 1 through 3. Further, the driving control of the first and second rotating boards 20 and 30 is similar to that of the first embodiment.

According to the second embodiment, the supporting member 10 is supported by the inner wall of the lens barrel through the flange 12. Accordingly, when the supporting member 10 is driven, the optical axis OP is prevented from inclining and the correction lens 11 is prevented from moving along the optical axis OP. Further, whatever way the camera is positioned when the camera is held, the weight component along the optical axis OP is not added to the first and second rotating boards 20 and 30. Accordingly, the control characteristics of the boards 20 and 30 can be improved.

Note that, in the first and second embodiments, the focused image tremble correcting device is applied to a camera. However, the correcting device can be applied to other optical devices, for example, binoculars and video cameras.

As described above, according to the present invention, in the focused image tremble correction, precise correction can be carried out with a simple mechanical structure.

The present disclosure relates to subject matter contained in Japanese Patent Application No. 2001-263424 (filed on Aug. 31, 2001) which is expressly incorporated herein, by reference, in its entirety.

What is claimed is:

1. A focused image tremble correcting device comprising:
    a tremble detector that detects a focused image tremble of an optical device;
    a correcting optical system for correcting said focused image tremble, said correcting optical system being included in an imaging optical system of said optical device;
    a first driving unit that includes: a first rotating board which is held being rotatable around a first axis parallel to the optical axis of said correcting optical system; and a first driving mechanism that drives said first rotating board, said first rotating board having a first opening;
    a second driving unit that includes: a second rotating board which is held being rotatable around a second axis which is parallel to said optical axis; and a second driving mechanism that drives said second rotating board, said second rotating board having a second opening; and
    a controller that controls said first and second driving units to move said correcting optical system such that said image tremble can be cancelled,
    wherein said correcting optical system is supported by a first pair of inner sides of said first opening and a second pair of inner sides of said second opening, said first pair of inner sides being parallel to a first straight line that is perpendicular to said optical axis and said first axis, said second pair of inner sides being parallel to a second straight line perpendicular to said optical axis and said second axis.

2. A focused image tremble correcting device according to claim 1, wherein when said correcting optical system is driven in accordance with a rotation of said first rotating board, said correcting optical system is moved along said first pair of inner sides, being led by said second pair of inner sides, and when said correcting optical system is driven in accordance with a rotation of said second rotating board, said correcting optical system is moved along said second pair of inner sides, being led by said first pair of inner sides.

3. A focused image tremble correcting device according to claim 2, wherein, in a two-dimensional coordinate system on a plane which is perpendicular to said optical axis of said correcting optical system that is positioned at a standard position in which said optical axis of said correction optical system is coaxial with an optical axis of other optical systems included in said imaging optical system, an origin of said two-dimensional coordinate being an intersection point of said optical axis of said correction optical system and said perpendicular plane, an X-axis of said two-dimensional coordinate being a straight line connecting said origin and an intersection point of said first axis and said perpendicular plane, a Y-axis of said two-dimensional coordinate being a straight line connecting said origin and an intersection point of said second axis and said perpendicular plane, a rotational angle θ1 of said first rotating board which is rotated to cancel said focused image tremble and a rotational angle θ2 of said second rotating board which is rotated to cancel said focused image tremble are calculated based on the formulas to follow:

$$\theta 1 = \tan^{-1}(p2/(d1+p1)) \quad (7)$$

$$\theta 2 = \tan^{-1}(p1/(d2+p2)) \quad (8)$$

(herein, d1: an absolute value of an X coordinate of said first axis in said two-dimensional coordinate d2: an absolute value of a Y coordinate of said second axis in said two-dimensional coordinate p1: an absolute value of an X coordinate of said optical axis of said correcting optical system being at an aimed position at which said correction optical system has to be moved to cancel said image tremble, p2: an absolute value of a Y coordinate of said optical axis of said correcting optical system being at said aimed position).

4. A focused image tremble correcting device according to claim 2, wherein said correcting optical system is held in a supporting member which has a generally cylindrical shape, and a flange which has a predetermined height is formed on an outer surface of said supporting member, and a cylindrical portion at one end side of said supporting member penetrates through said first opening, and a cylindrical portion at another end side of said supporting member penetrates through said second opening, and said first and second rotating boards are provided so as to hold said flange therebetween.

5. A focused image tremble correcting device according to claim 2, wherein said correcting optical system is held in a supporting member which has a generally cylindrical shape, and a flange which has a predetermined height is formed on an outer surface of said supporting member, and a cylindrical portion at one end side of said supporting member penetrates through said first opening, and a cylindrical portion at another end side of said supporting member penetrates through said second opening, and said flange is slidably engaged with slits which are formed at an inner wall of said optical device.

6. A focused image tremble correcting device according to claim 1, wherein said correcting optical system is supported by a supporting member which has a generally cylindrical shape, and said first opening has a generally rectangular shape, the long sides of which are said first pair of inner sides, and said second opening has generally rectangular shape, the long sides of which are said second pair of inner sides.

7. A focused image tremble correcting device according to claim 1, wherein a line which connects said optical axis of said correcting optical system and said first axis and a line which connects said optical axis of said correcting optical system and said second axis cross at right angles.

8. A focused image tremble correcting device according to claim 1, further comprising a position detecting mechanism that detects the position of said first and second rotating boards, wherein said controller calculates the driving amount of said first and second rotating boards based on the result of the detection by said tremble detector and the result of the detection by said position detecting mechanism.

* * * * *